United States Patent [19]

Gauger

[11] Patent Number: 5,426,276
[45] Date of Patent: Jun. 20, 1995

[54] STUD-WELDING APPARATUS
[75] Inventor: Wolfgang Gauger, Menden, Germany
[73] Assignee: OBO Bettermann OHG, Menden, Germany
[21] Appl. No.: 272,200
[22] Filed: Jul. 8, 1994
[30] Foreign Application Priority Data
Jul. 8, 1993 [DE] Germany .................. 43 22 831.3
[51] Int. Cl.6 .................................................. B23K 9/20
[52] U.S. Cl. .................................................... 219/98
[58] Field of Search .................................. 219/98, 99
[56] References Cited

U.S. PATENT DOCUMENTS 2,935,595  5/1960  Bullis et al. ............................ 219/98
4,629,857 12/1986  Gauger .
4,969,582 11/1990  Gauger .

*Primary Examiner*—Clifford C. Shaw
*Attorney, Agent, or Firm*—Herbert Dubno; Andrew Wilford

[57] ABSTRACT

An apparatus for welding a stud to a substrate has a housing, a rear tubular element fixed in the housing and defining a rear passage portion, and a front tubular element in the housing defining a front passage portion itself defining an axis and forming with the rear passage portion a continuous passage. The front tubular element has a front end and is limitedly axially displaceable in the housing between a front position and a rear position. A spring braced between the front tubular element and the housing urges the front element axially forward relative to the housing into the front position. A chuck or holder at the front end is adapted to hold the stud. A sleeve fixed to the housing has a front edge lying axially rearward of the front end in the front position of the front element and axially forward of the front element in the rear position so that when the stud in the holder is pressed axially forward against the substrate the stud and front element move axially backward in the housing. An electrical current is passed between the stud in the holder and the substrate when the stud is engaged against the substrate for welding the stud to the substrate.

9 Claims, 1 Drawing Sheet

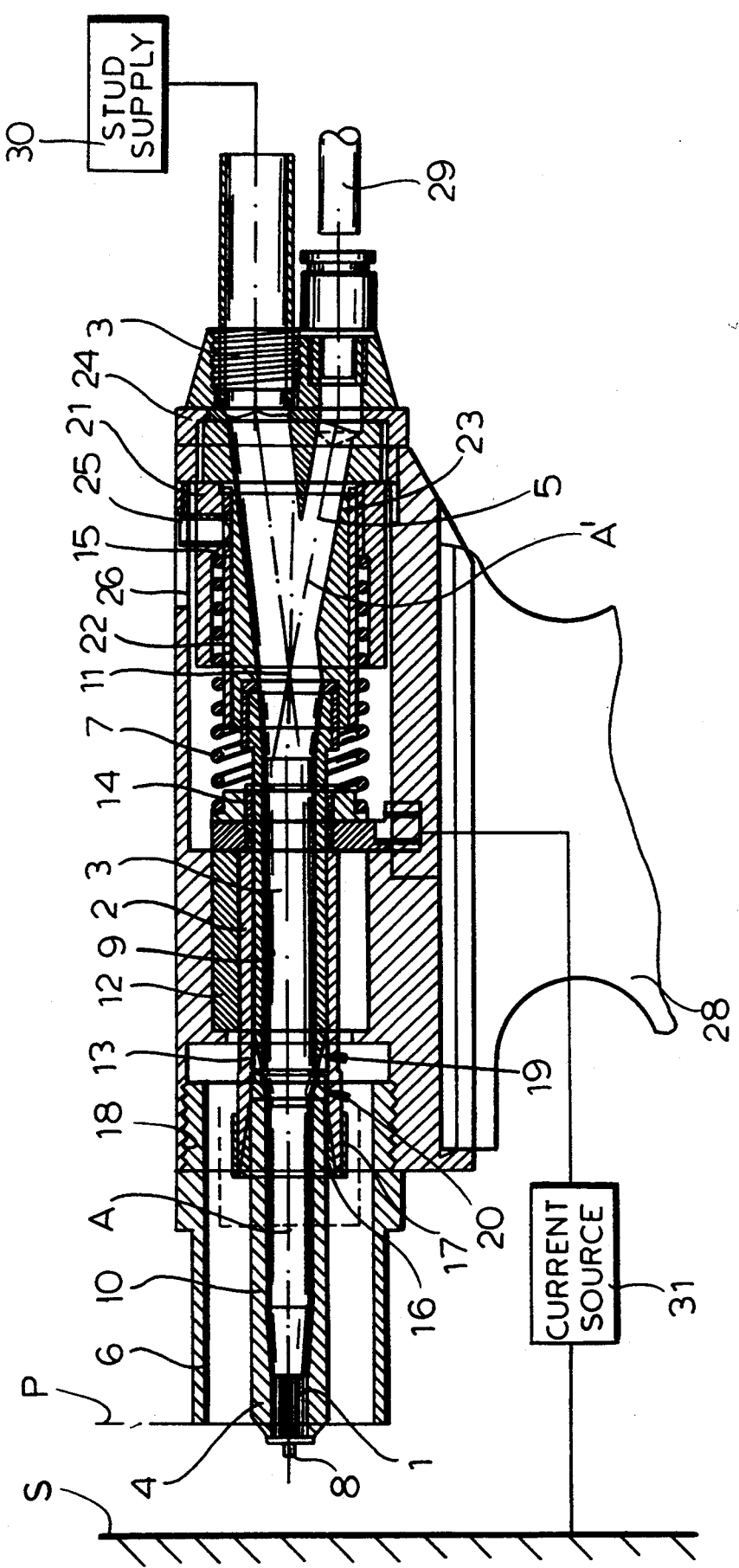

STUD-WELDING APPARATUS

FIELD OF THE INVENTION

The present invention relates to a stud-welding apparatus. More particularly this invention concerns such a device which is used to weld a metallic stud to a metallic substrate.

BACKGROUND OF THE INVENTION

A standard stud-welding apparatus such as described in my earlier U.S. Pat. No. 4,969,582 has a housing formed with a main throughgoing passage having a rear end connected to a stud feeder and a front end provided with a stud holder. A lateral branch extending backward at a very sharp acute angle from the main passage accommodates a flexible loading element. A stud is fed into the rear end of the main passage, normally pneumatically, to a location somewhat forward of the lateral branch, and then the loading element is moved forward from the lateral branch into the main passage behind the stud to shove it forward so that it ends up in the holder projecting from the front end of the housing.

Typically the housing is provided with a spring-loaded sleeve that coaxially surrounds the front passage end and that has a front edge that typically projects somewhat forward past the stud in the holder. To set a stud the sleeve is pressed against the stud enough to push it against the force of its spring back into the housing so that the fuse tip of the stud can be brought into direct engagement with the substrate. A large electrical current is made to flow between the substrate and the stud to melt the fuse tip, whereby the spring allows the housing to move forward, flattening the melted tip between the stud and the substrate and thereby welding the stud to the substrate.

The disadvantage of this system is that the relatively large mass of the tool must be moved with the stud when its tip is melted to complete the welding operation. The considerable inertia of these elements therefore means that this movement will be somewhat sluggish. As a result the time that it will take the stud to move against the substrate after its tip is melted can be long enough for the tip to partially harden, making a bad weld.

OBJECTS OF THE INVENTION

It is therefore an object of the present invention to provide an improved stud-welding apparatus.

Another object is the provision of such an improved stud-welding apparatus which overcomes the above-given disadvantages, that is which moves the stud very rapidly against the substrate once its tip is melted.

SUMMARY OF THE INVENTION

An apparatus for welding a stud to a substrate has according to the invention a housing, a rear tubular element fixed in the housing and defining a rear passage portion, and a front tubular element in the housing defining a front passage portion itself defining an axis and forming with the rear passage portion a continuous passage. The front tubular element has a front end and is limitedly axially displaceable in the housing between a front position and a rear position. A spring braced between the front tubular element and the housing urges the front element axially forward relative to the housing into the front position. A chuck or holder at the front end is adapted to hold the stud. A sleeve fixed to the housing has a front edge lying axially rearward of the front end in the front position of the front element and axially forward of the front element in the rear position so that when the stud in the holder is pressed axially forward against the substrate the stud and front element move axially backward in the housing. An electrical current is passed between the stud in the holder and the substrate when the stud is engaged against the substrate for welding the stud to the substrate.

Thus with this system once the current has melted and/or vaporized the tip of the stud, the stud can be snapped forward by the spring. The spring only has to move the stud and front guide tube, so that it has little mass to deal with and can be counted on to move these parts very rapidly, compared to the prior art systems where the spring had to move the entire device.

According to the invention structure in the housing forms a passage branch opening laterally into the rear passage portion. A flexible plunger engageable through the passage branch into the passage can push the stud along the passage to the holder. The holder is a spreadable chuck-type arrangement that the stud can be forced through from the rear.

The front tubular element according to the invention includes a guide tube coaxially receiving the rear tubular element and having a rear end braced axially against the spring. It has a rear end with an internal frustoconical bevel and the rear tubular element has a front end with a complementary external frustoconical bevel. The bevels overlap axially in the front position and fitting snugly together in the rear position. The housing is provided with an axially displaceable abutment ring against which the spring bears axially backwardly. In addition the housing includes a threaded element threadedly engaged with the abutment ring and rotatable to axially displace the abutment ring.

The current-applying means includes a terminal in contact with the guide tube and the housing is provided with a laterally projecting handle.

BRIEF DESCRIPTION OF THE DRAWING

The above and other objects, features, and advantages will become more readily apparent from the following description, reference being made to the accompanying drawing whose sole figure is a partly diagrammatic axial section through the apparatus of this invention.

SPECIFIC DESCRIPTION

As seen in the drawing, the stud setter according to this invention has a housing 2 provided with a handle 28 and connected to a supply 30 of studs 1 and to a current source 31 also connected to a substrate S to which the studs 1 are to be welded. A main passage 3 in the housing 2 has a rear end connected to the stud supply 30 and a front end formed as a holder 4 for the studs 1 which have small fusible tips 8. This passage 3 extends at the front of the housing 2 along an axis A. A cylindrical sleeve 6 secured at screwthreads 18 to the housing 2 has a front end lying in a plane P perpendicular to the axis A on which the sleeve 6 is centered.

More specifically the passage 3 is formed by a front tube 10 that is axially displaceable in the housing 2 as described below and a rear tube 9 that is fixed in the housing. In addition a passage branch 5 extends rearward along an axis A' from the passage A, with the axes A and A' meeting at a small acute angle at 11, and a flexible plunger 29 can be pushed into this passage 5 to push a stud 1 from the supply 30 forward into the holder tip 4 of the front tube 10.

The front tube 10 has a rear end formed with an internal frustoconical bevel 20 and the rear tube 9 has a front end formed with a complementary external frustoconical bevel 19. In the illustrated forward position of the front tube 10 the extreme rear end of the front tube 10 is just slightly rearward of the extreme front end of the rear tube 9 and the holder 4 with its stud 1 projects forward somewhat past the plane P. A collet sleeve 16 on the rear end of the tube 10 fits in the front end of a guide tube 13 and is secured in place by a collet nut 17. This guide tube 13 can slide axially in a guide 12 fixed in the housing. At its rear end the guide tube 13 carries a ring 14 against which is braced the front end of a coil spring 7 whose rear end is braced against a shoulder 15 of an adjustment element 21.

The guide tube 13 and front tube 11 are electrically conductive, normally metallic. In addition the guide tube 13 is provided with a terminal 27 to which the current source is connected. The sleeve 6 and housing 2 are otherwise insulated from the tubes 10 and 13.

An adjustment ring 24 is rotatable on the rear end of the housing and is rotationally coupled to a sleeve 23 that is coupled via screwthreads 22 to the ring 21 which is provided with a radially projecting pin 25 fitted in an axially extending slot 26 of the housing 2. Thus if the ring 24 is rotated in one direction about the axis A the element 21 will be moved axially forward, increasing the compression of the spring 7, and opposite rotation will move it back.

The device described above operates as follows:

To start with a stud 1 form the supply is advanced along the passage 3 past the intersection 11, then the plunger 29 is used as described in my above-mentioned patent to push it forward and fit it to the gripper-type holder 4 in the illustrated position.

Then the tool is pressed against the substrate S so that the plane P lies flat on this substrate S and the front tube 10 and its guide tube 13 are pressed back in the housing 2, thereby compressing the spring 7.

The current source 31 is then actuated to pass a large pulse of electricity between the substrate S and the stud 1. This will melt the tip 8 and therefore allow the stud 1 to move axially forward into flat engagement with the substrate S. Since the spring 7 need only move the tubes 10 and 13 with the stud 1, this movement will be very fast. The tool is then pulled off the stud 1 which is left welded to the substrate S.

I claim:

1. An apparatus for welding a stud to a substrate, the apparatus comprising:
    a housing;
    a rear tubular element fixed in the housing and defining a rear passage portion;
    a front tubular element in the housing defining a front passage portion itself defining an axis and forming with the rear passage portion a continuous passage, the front tubular element having a front end and being limitedly axially displaceable in the housing between a front position and a rear position;
    a spring braced between the front tubular element and the housing and urging the front element axially forward relative to the housing into the front position;
    a holder at the front end adapted to hold the stud;
    a sleeve fixed to the housing and having a front edge lying axially rearward of the front end in the front position of the front element and axially forward of the front element in the rear position, whereby when the stud in the holder is pressed axially forward against the substrate the stud and front element move axially backward in the housing; and
    means for passing an electrical current between the stud in the holder and the substrate when the stud is engaged against the substrate for welding the stud to the substrate.

2. The apparatus defined in claim 1, further comprising:
    structure in the housing forming a passage branch opening laterally into the rear passage portion; and
    means including a flexible plunger engageable through the passage branch into the passage for pushing the stud along the passage to the holder.

3. The apparatus defined in claim 2 wherein the front tubular element has a rear end with an internal frustoconical bevel and the rear tubular element has a front end with a complementary external frustoconical bevel, the bevels overlapping axially in the front position and fitting snugly together in the rear position.

4. The apparatus defined in claim 2 wherein the housing is provided with an axially displaceable abutment ring against which the spring bears axially backwardly.

5. The apparatus defined in claim 4 wherein the housing includes a threaded element threadedly engaged with the abutment ring and rotatable to axially displace the abutment ring.

6. The apparatus defined in claim 2 wherein the current-passing means includes a terminal in contact with the guide tube.

7. The apparatus defined in claim 1 wherein the front tubular element includes a guide tube coaxially receiving the rear tubular element and having a rear end braced axially against the spring.

8. The apparatus defined in claim 1 wherein the housing is provided with a laterally projecting handle.

9. An apparatus for welding a stud to a substrate, the apparatus comprising:
    a housing;
    a rear tube fixed in the housing and defining a rear passage portion;
    a front tube in the housing defining a front passage portion itself defining an axis and forming with the rear passage portion a continuous passage, the front tube having a front end and being limitedly axially displaceable in the housing between a front position and a rear position;
    structure in the housing forming a passage branch opening laterally into the rear passage portion; and
    means including a flexible plunger engageable through the passage branch into the passage for pushing the stud along the passage to the holder;
    a spring braced between the front tube and the housing and urging the front tube axially forward relative to the housing into the front position;
    a holder at the front end adapted to hold the stud;
    a sleeve fixed to the housing and having a front edge lying axially rearward of the front end in the front position of the front tube and axially forward of the front tube in the rear position, whereby when the stud in the holder is pressed axially forward against the substrate the stud and front tube move axially backward in the housing; and
    means for passing an electrical current between the stud in the holder and the substrate when the stud is engaged against the substrate for welding the stud to the substrate.

* * * * *